US008666342B1

(12) United States Patent
Adabi et al.

(10) Patent No.: US 8,666,342 B1
(45) Date of Patent: Mar. 4, 2014

(54) REFLECTION-TYPE VARIABLE ATTENUATORS

(71) Applicant: Broadcom Corporation, Irvine, CA (US)

(72) Inventors: Ehsan Adabi, Newport Beach, CA (US); Tirdad Sowlati, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/763,556

(22) Filed: Feb. 8, 2013

(51) Int. Cl.
*H04B 1/04* (2006.01)

(52) U.S. Cl.
USPC ...................... 455/129; 455/127.2; 455/550.1

(58) Field of Classification Search
USPC ........... 455/78–80, 82, 83, 127.1, 127.2, 129, 455/550.1
See application file for complete search history.

(56) References Cited

U.S. PATENT DOCUMENTS 4,723,307 A * 2/1988 Clark et al. ................... 455/103
5,222,246 A * 6/1993 Wolkstein .................... 455/13.4
5,778,306 A * 7/1998 Kommrusch ................... 455/78
5,999,053 A 12/1999 Eschauzier
5,999,056 A 12/1999 Fong
6,055,418 A * 4/2000 Harris et al. .................... 455/91
8,095,098 B2 * 1/2012 Brooks et al. .............. 455/182.1

OTHER PUBLICATIONS

Dogan, et al., “Analysis and Design of RF CMOS Attenuators,” IEEE Journal of Solid-State Circuits, Oct. 2008, vol. 43, No. 10, pp. 2269-2283.

Bulja, et al., “Variable Reflection-Type Attenuators Based on Varactor Diodes,” IEEE Transactions on Microwave Theory and Techniques, Dec. 2012, vol. 60, No. 12, pp. 3719-3727.

Nam, et al., “Wideband reflection type MMIC attenuator with constant phase,” Electronics Letters, Jan. 8, 1998, vol. 34, No. 1, pp. 91-93.

Trent, et al., “S-Band Reflection Type Variable Attenuator,” IEEE Microwave and Wireless Components Letters, Jul. 2002, vol. 12, No. 7, pp. 243-245.

Kang, et al., “Reflection-Type Low-Phase-Shift Attenuator,” IEEE Transactions on Microwave Theory and Techniques, Jul. 1998, vol. 46, No. 7, pp. 1019-1021.

Natarajan, et al., “A 60GHz Variable-Gain LNA in 65nm CMOS,” IEEE Asian Solid State Circuits Conference, Nov. 2008, Fukuoa, Japan, pp. 117-120.

Xiao, et al., “A High Dynamic Range CMOS Variable Gain Amplifier for Mobile DTV Tuner,” IEEE Journal of Solid-State Circuits, Feb. 2007, vol. 42, No. 2, pp. 292-301.

* cited by examiner

*Primary Examiner* — Nhan Le
(74) *Attorney, Agent, or Firm* — McDermott Will & Emery LLP

(57) ABSTRACT

A circuit for a reflection-type variable attenuator may include a hybrid module including an input port, an output port, a first reflection port, and a second reflection port. The hybrid module may be configured to split an incident signal received at the input port into a first and a second input signal. A first and a second reflection circuit may be coupled to the first and the second reflection ports, respectively. The first and the second reflection circuits each may include one or more transistors, and may be configured to, respectively, reflect the first and the second input signals to generate a first and a second reflected signal, which are directed to the output port to be constructively combined to form an output signal that is an attenuated replica of the incident signal. A variable attenuation may be achieved by controlling amount of reflection through the reflection circuits.

20 Claims, 10 Drawing Sheets

400B

500

REFLECTION-TYPE VARIABLE ATTENUATORS

TECHNICAL FIELD

The present description relates generally to gain control, and more particularly, but not exclusively, to reflection-type variable attenuators.

BACKGROUND

Variable attenuators are used in a host of applications wherever a signal power level variation and reduction is desired. A number of such applications include communication system and devices, such as wireless area network systems, mobile communication devices, global positioning system (GPS) receivers, and the like. For example, in transmitters including wireless transmitters, in situations where a lower transmit power is sufficient to maintain a communication link, decreasing the output power level may be desired in order to prevent saturating receivers in the vicinity of the transmitter with a high power transmission signal. On the other hand, in receivers, when the input received signal is too high and can potentially saturate some building blocks down in the receive chain, an attenuator may be applied to lower the signal level, and relax the linearity specification on the following building blocks.

Existing solutions are provided in a number of topologies, for example, current commuting variable gain amplifiers (VGAs), CMOS hybrid-pi attenuators, variable resistance load amplifiers (e.g., with a shunt FET), and reflection-type attenuators such as low-phase-shift and varactor diode type attenuators. The existing solutions, although may work for their objective applications, exhibit a number of shortcomings in addressing desired linearity, noise performance, high frequency operation, and providing matched input and output ports.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more implementations. In one or more instances, well-known structures and components are shown in block diagram form in order to avoid obscuring the concepts of the subject technology.

Figure 1A:
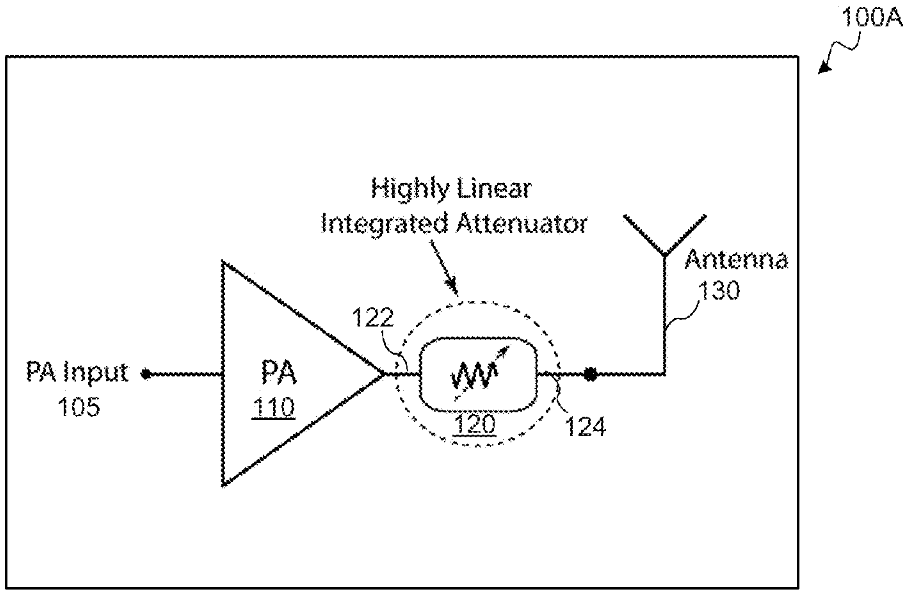
FIG. 1A illustrates an example output stage of a transmitter including a reflection-type variable attenuator in accordance with one or more implementations.

FIG. 1A illustrates an example output stage of a transmitter 100A including a reflection-type variable attenuator 120 in accordance with one or more implementations of the subject technology. The output stage of the transmitter 100A may include a power amplifier (PA) 110, the reflection-type variable attenuator 120, and an antenna 130. The PA input 105 may be provided by a preceding stage of the transmitter 100A that may include one or more up-conversion mixers, a local oscillator (LO) generator, and a mixed signal portion, which are not shown here in the interest of brevity.

In one or more implementations of the subject technology, the transmitter 100A may be a high-frequency transmitter, such as an E-band transmitter targeted for wireless backhaul of a base-station, for which the attenuator design may face a number of challenges that are addressed by the subject technology. Although the reflection-type variable attenuator 120 may be used before the PA 110, but in the present disclosure, with high frequency operation (e.g., 85 GHz) in wireless-backhaul applications, specifications may be demanding on noise, linearity and variable gain range. Therefore, for the example applications in wireless backhaul, it may be advantageous to push the variable gain block (reflection-type variable attenuator 120) as close as possible to the antenna 130. This may be due to the stringent signal-to-noise (SNR) specification and high Noise Figure (NF) of the RF blocks, in the example wireless-backhaul applications, and the fact that using the variable attenuator in early stages can have a substantial adverse effect on the overall NF of the transmitter 100A.

During signal transmission, the transmitter 100A may have to lower the output power level in order to prevent saturating receivers in the vicinity of the transmitter 100A with a high power transmission signal, where a lower transmit power may be sufficient to maintain a communication link. The transmitter 100A may use the reflection-type variable attenuator 120 to change the power of a signal delivered to an input port 122 and provide an attenuated signal at a lower power at an output port 124. The reflection-type variable attenuator 120 may provide a high attenuation range (e.g., 3-30 dB) and desirable noise and linearity performances at high operating frequencies (e.g., in the range of approximately 50-100 GHz), as discussed in more detail herein.

Figure 1B:
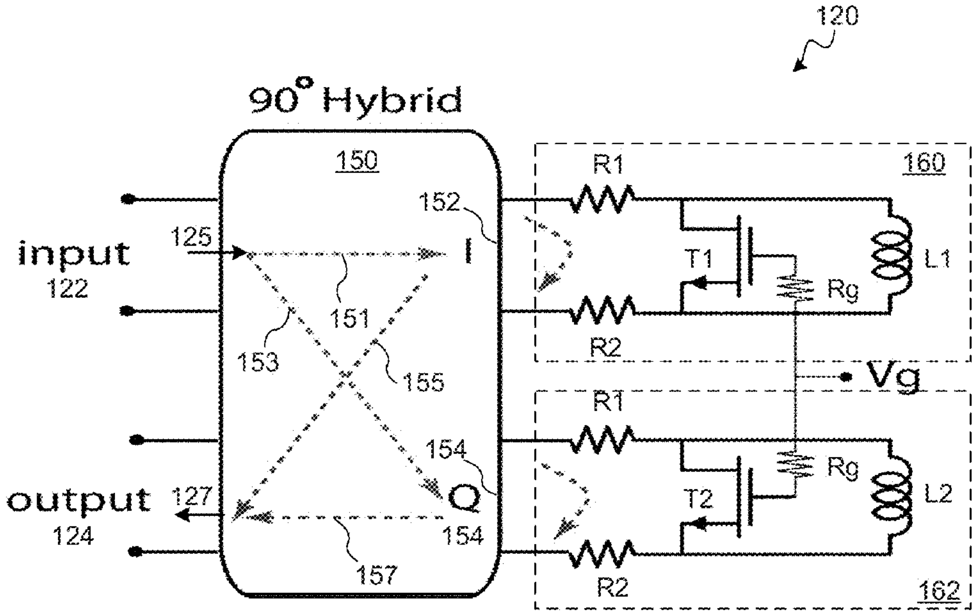
FIG. 1B illustrates an example implementation of a reflection-type variable attenuator in accordance with one or more implementations.

FIG. 1B illustrates an example implementation of a reflection-type variable attenuator 120 in accordance with one or more implementations of the subject technology. The reflection-type variable attenuator (hereinafter "variable attenuator") 120 may include a hybrid module 150 (e.g., a 90° or quadrature hybrid module) including an input port 122, an output port 124, a first reflection port 152 (e.g., in-phase (I)), and a second reflection port 154 (e.g., quadrature (Q)). The hybrid module 120 may be configured to split an incident signal 125 received at the input port 122 into a first input signal 151 and a second input signal 153. A first reflection circuit 160 and a second reflection circuit 162 may be coupled to the first and the second reflection ports 152 and 154, respectively. Each of the first and the second reflection circuits 160 and 162 may include a transistor (e.g., T1 and T2).

The first reflection circuit 160 may be configured to reflect the first input signal 151 and generate a first reflected signal 155. The second reflection circuit 162 may be configured to reflect the second input signal 153 and generate a second reflected signal 157. The hybrid module 150 may further be configured to direct the first and the second reflected signals 155 and 157 to the output port 124, where the first and the second reflected signals 155 and 157 may be constructively combined to form an output signal 127. The output signal 127 may be an attenuated replica of the incident signal 125. The reference to I and Q, respectively, for the first and the second reflection ports 152 and 154 may arise from the fact that the input signal 153, once reached the reflection port 154, may experience a 90° phase shift with respect to the signal 151 received at the reflection port 152. It is understood, however, the reflected signal 155 may experience the same phase shift (e.g., 90°) while traveling a similar path through the hybrid module 150, and therefore, the reflected signals 155 and 157, at the output port 125 have the same phase and can add up constructively.

The variable attenuation may be achieved by controlling an amount of reflection through the first and the second reflection circuits 160 and 162. Each of the first and the second reflection circuits 160 and 162 may include termination resistors R1 and R2 (e.g., having resistances R1 and R2, respectively). In one or more implementations, the sum of the resistances R1 and R2 may match the characteristic impedance (e.g., $Z_0$~50Ω or 100Ω) of the hybrid module 150, at the reflection ports 152 and 154. The amount of reflection through the first and the second reflection circuits 160 and 162 may be realized by variation of the bias voltage (e.g., control voltage) Vg applied to the gate terminals of the transistors T1 and T2 (e.g., MOS transistors, such as NMOS transistors), through resistors Rg (e.g., with a resistances Rg). In one or more aspects of the subject technology, the resistors Rg may have a large resistance, for example, in the multi MΩ range.

The transistors T1 and T2 may be biased (e.g., via a control voltage Vg) in the triode region (or the off region) of the transistor characteristic, which is most suitable for variable-resistor operation of the transistor. The inductances L1 and L2 may be used to tune the parasitic capacitances of the transistors T1 and T2, so that the impedance of the reflection circuits 160 and 162, as seen from the reflection ports 152 and 154, are substantially resistive. In one or more implementation of the subject technology, the transistors T1 and T2, and inductors L1 and L2 may be similar.

In one or more implementation of the subject technology, when the control voltage Vg is at its lowest value (e.g., 0V), the transistors T1 and T2 may be effectively open circuit and substantially high resistances may be seen at the reflection ports 152 and 154. The substantially high resistances at the reflection ports 152 and 154 may imply that almost no signal power is dissipated in the reflection circuits 160 and 162, and the reflected signals 155 and 157 are nearly the same as the respective input signals 151 and 153. On the other hand, when the voltage Vg is at its highest value (e.g., 2V), the transistors T1 and T2 may be effectively short circuit, and the resistances seen at the reflection ports 152 and 154 may be matched resistances (e.g., R1 and R2), which may drastically dissipate the signal power of the input signals 151 and 153, such that almost no signal can be reflected from the reflection ports 152 and 154 (e.g., nearly zero power for the reflected signals 155 and 157). One advantage of using the matched resistances (e.g., R1 and R2) is that the impedance at the reflection points 152 and 154 cannot drop below the matched resistance. Without the matched resistances, the impedance at the reflection points 152 and 154 may drop below $Z_0$ that may result in reflection back of the input signals 151 and 153 with an inverted phase, which in turn may lead to violation of the monotonicity condition.

When the applied control voltage Vg is somewhere between the lowest and the highest value (e.g., between 01-2V), the resistance seen at the reflection ports 152 and 154 may be larger than the resistance of the termination resistors (e.g., matched resistances R1 and R2), and a portion of the input signals 151 and 153 are reflected back into the hybrid module 150, at the reflection ports 152 and 154. In other words, the signal power attenuation in the reflection circuits 160 and 162 can be achieved with a significant attenuation range (e.g., 3-30 dB) by controlling the amount of signal reflection of the reflection circuits 160 and 162, via variation of the control voltage Vg.

The reflected signals 155 and 157, when appearing at the output port 124, have already traveled through the hybrid module 150 twice. As a result, the reflected signals 155 and 157, at the output port 124, have experienced two times the insertion loss of the hybrid module 150, which may be a fixed loss (e.g., ~1 dB). Depending on the setting of the control voltage Vg, the amount of reflection at reflection ports 152 and 154 can be adjusted, and this is the process that creates the variable attenuation. In conclusion, the output signal 127 may see, for example, a constant attenuation, which may be two times the insertion loss of the hybrid (e.g., ~2×1 dB) plus a variable attenuation based on the reflection scenario at reflection ports 152 and 154 (e.g., ~ from 0 dB up to 50 dB of attenuation). It is understood, however, that after the parasitic extraction and including the losses due to coupling and isolation issues that may exist in an integrated version implemented on-chip (e.g., in certain specific technologies), a maximum attenuation of 30 dB may be more feasible.

Figure 1C:
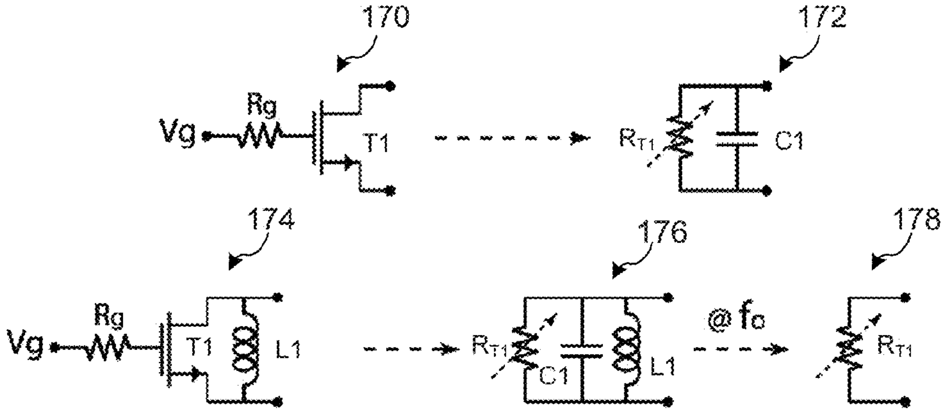
FIG. 1C illustrates examples of equivalent circuits for a portion of the reflection-type variable attenuator of FIG. 1B in accordance with one or more implementations.

FIG. 1C illustrates examples of equivalent circuits 172 and 178 for portions 170 and 174 of the reflection-type variable attenuator 120 of FIG. 1B in accordance with one or more implementations of the subject technology. The equivalent circuit 172 corresponds to the transistor T1 (or T2), where the variable resistor $R_{T1}$ is the resistance of the transistor T1 (or T2) that varies with variation of the control voltage Vg, and capacitor C1 is a parasitic capacitance associated with the transistor T1. The parasitic capacitance C1 may be an almost constant capacitance (e.g., with variation of ~10%). To tune the parasitic capacitance C1, an inductor L1 (e.g., with an inductance L1) may be applied between the drain and source terminals of the transistor T1. At the operating frequency (e.g., 85 GHz) of the variable attenuator 120 of FIG. 1B, the equivalent circuit 176 may be reduced to the equivalent circuit 178 that is a nearly pure variable resistor $R_{T1}$. This is because at the operating frequency, the inductor L1 can fully tune out the parasitic capacitance C1. It is interesting to note that the RC approximation of a NMOS transistor T1 (or T2), which is used as a variable load, may be valid even beyond the transit frequency (ft) of the process. Therefore, even though in SiGe technology (e.g., 180 nm SiGe technology), the ft of CMOS is ~50 GHz and the ft of BJT is ~200 GHz, the variable attenuator 120 may be implemented with CMOS technology and at a significantly higher operating frequency than the corresponding ft, for example, 85 GHz. It is understood that for variable gain topologies, the use of a CMOS (e.g. NMOS or PMOS) transistor as a variable load may be more beneficial in view of the better linearity offered by CMOS transistors.

Figure 2A:
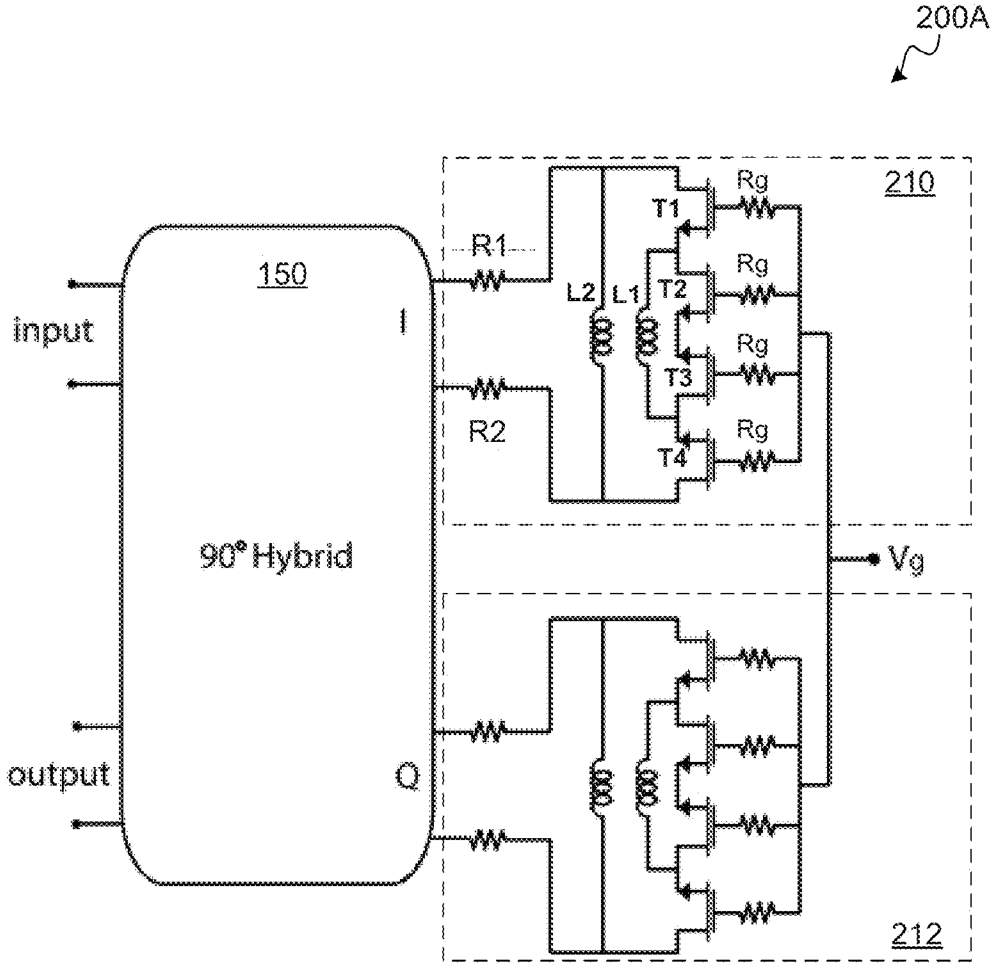
FIG. 2A illustrates an example implementation of a reflection-type variable attenuator in accordance with one or more implementations.

FIG. 2A illustrates an example implementation of a reflection-type variable attenuator 200A in accordance with one or more implementations of the subject technology. The reflection-type variable attenuator 200A is similar to the reflection-type variable attenuator 120 of FIG. 1B, except for the reflection circuits 210 and 212, which are different from the reflection circuits 160 and 162 of FIG. 1B. In the reflection circuits 210 and 212, instead of the single transistors T1 (or T2) of FIG. 1B, multiple transistors (e.g., stacked transistors T1-T4) are used. Each of the transistors T1-T4 may be coupled to the control voltage Vg, via a resistor Rg. The inductors L1 and L2, coupled between the drain terminals of the transistors T2 and T3, and the drain terminals of the transistors T1 and T4, respectively, may act as tuning inductances. The advantages of the stacked-transistor topology of FIG. 2A may include achievement of a better linearity performance, and in some cases, a higher range of attenuation variation, as compared to the single transistor topology of FIG. 1B.

Figure 2B:
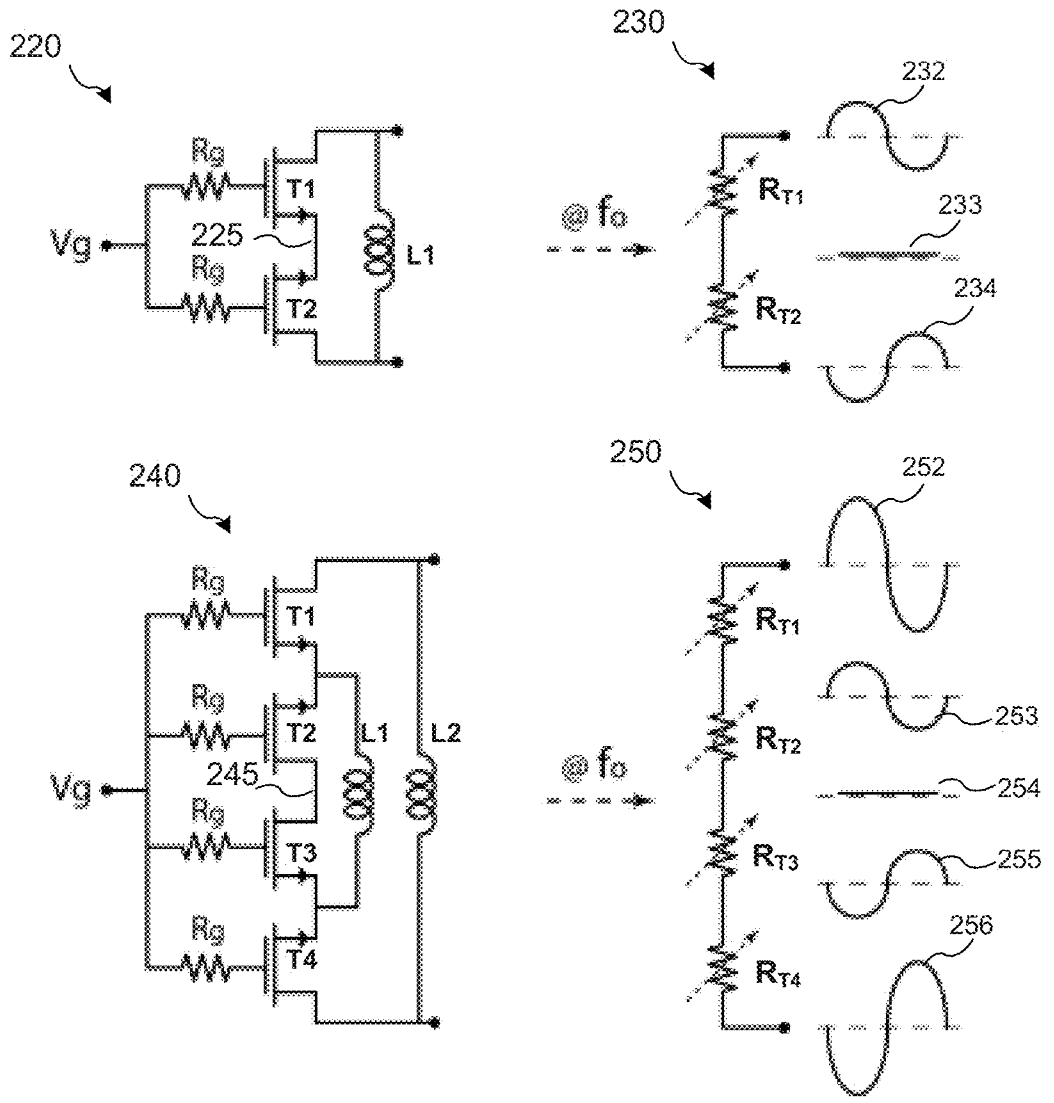
FIG. 2B illustrates examples of equivalent circuits and output waveforms for portions of reflection-type variable attenuators in accordance with one or more implementations.

FIG. 2B illustrates examples of equivalent circuits 230 and 250 and output waveforms 232-234 and 252-256 for portions of variable attenuators in accordance with one or more implementations of the subject technology. The equivalent circuits 230 and 250 correspond to portions 220 and 240, at the operating frequency of $f_0$ (e.g., 85 GHz), where a differential inductance L1 of portion 220 and differential inductances L1 and L2 of the portion 240 may tune out the parasitic capacitances of transistors T1-T2 of portion 220, and of transistors T1-T4 of portion 220. The portion 240 may correspond to the variable attenuator 200A of FIG. 2A (e.g., a four-transistor stacked topology), and the portion 220 may represent a two-transistor stacked topology. Due to the differential operation of portions 220 and 240, the middle nodes 225 and 245 are at virtual ground and may not need any tuning inductors.

The waveforms 232 and 234 may correspond to the lowest attenuation resulting from the lowest value (e.g., 0V) of the applied control voltage Vg, whereas the waveform 233 may correspond to the highest attenuation resulting from the highest value (e.g., 2V) of the applied control voltage Vg. The two-transistor stacked topology (e.g., 220) may allow twice a voltage swing, as compared to a single transistor topology (e.g., FIG. 1B). Similarly, the waveforms 252-256, indicate that a larger voltage swing can be sustained on the variable load 250 corresponding to the four-transistor stacked topology of the portion 240, as compared to the variable load 230 corresponding to the two-transistor stacked topology of the portion 220. The higher number of transistors in the stack may also translate into higher linearity for the variable attenuator.

It is noted that a large value of the resistance Rg may make it possible for the voltage at the gate terminals of the transistors (e.g., T1-T2 or T1-T4) to follow swinging of the voltages at the drain and source terminals of the transistors. Otherwise, the voltage drops $V_{GS}$ and $V_{DS}$ of the transistors may be affected by the voltage swings of the drain and source terminals, which can result, for example, in distortion of the reflected signals (e.g., 155 and 157 of FIG. 1B).

Figure 2D:
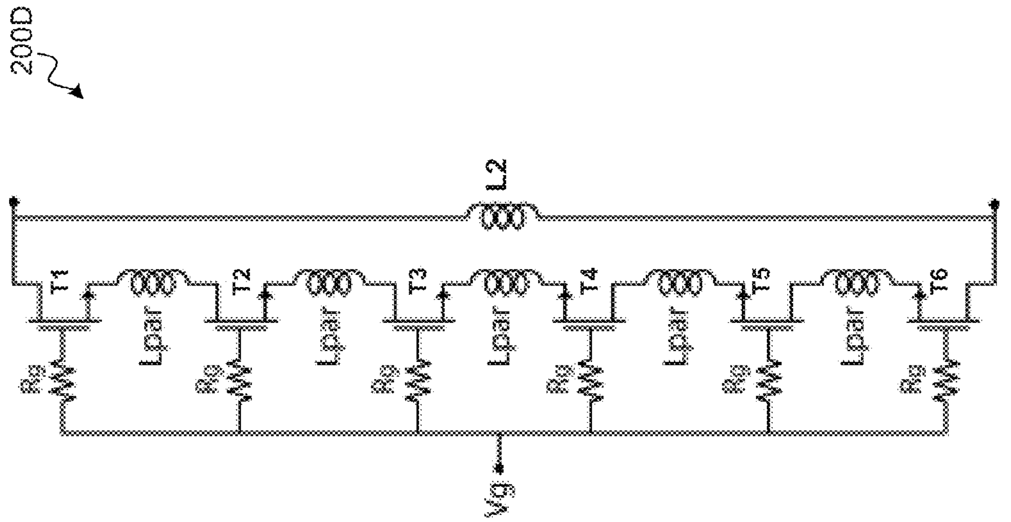
FIG. 2C-2E illustrate example implementations of a reflection-type variable attenuator in accordance with one or more implementations.
Figure 2C:
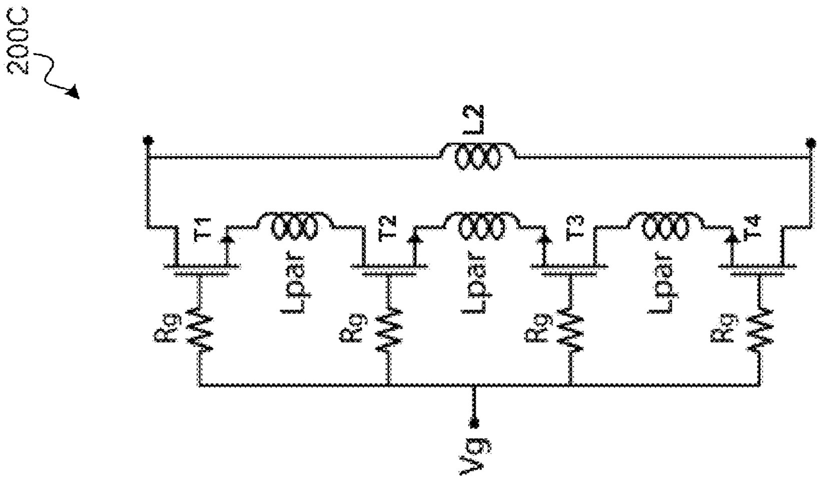
Figure 2E:
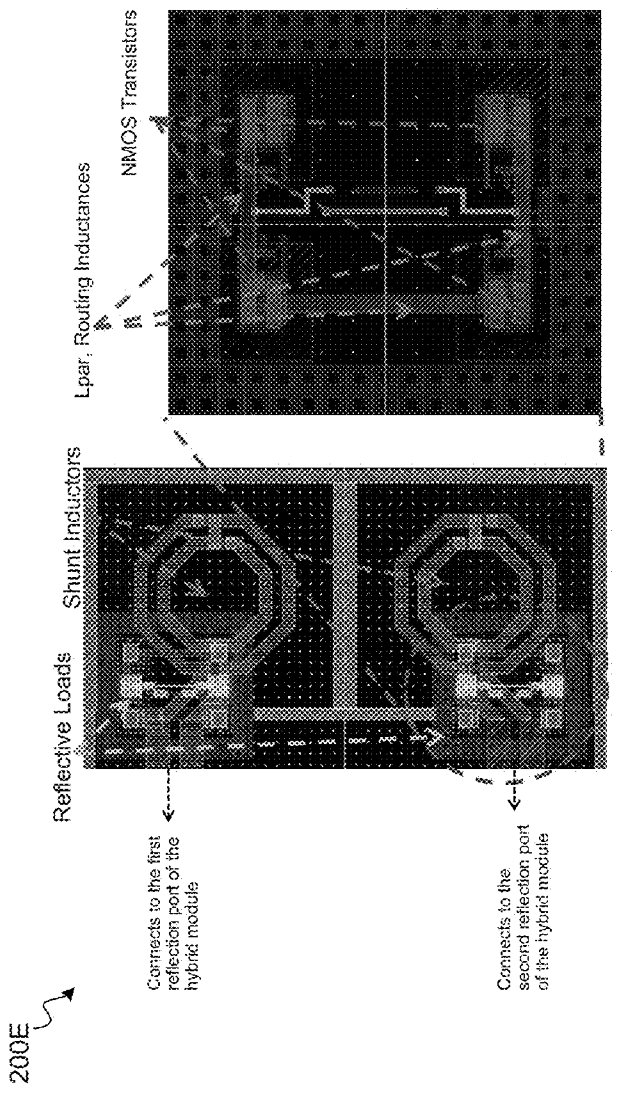

FIG. 2C-2E illustrate example implementations of a reflection-type variable attenuator in accordance with one or more implementations. In the example implementation 200C shown in FIG. 2C, instead of using the shunt differential inductance L1 of portion 240 of FIG. 2B, series inductances $L_{par}$ may be advantageously used in between adjacent transistors (e.g., T1-T2, T2-T3, and T3-T4), while keeping the inductance (e.g., shunt inductance) L2 of FIG. 2B. The shunt differential inductance L1 may be problematic in layout, when two relatively large inductances L1 and L2 are to be laid out in a close proximity. The series inductances $L_{par}$, on the other hand, may be considerably smaller (e.g., ≈25 pH) and can be readily realized with the already existing routing lines between the transistors (e.g., T1-T4), which can be designed to have the exact desired values. It is to be noted here that the use of the series inductances $L_{par}$ does not have any adverse effect on the performance of the reflection-type attenuator.

The example implementation 200D shown in FIG. 2D, is similar to the example implementation 200C, except that the number of transistors are increased to six. The scalability feature of the configurations used in the example implementations 200C and 200D, as well the ease of realization with additional transistors are among the advantages of these configurations. It is understood that adding more transistors with suitable series inductances (e.g., $L_{par}$) in between the added transistors may improve the linearity of the stack. This is because more voltage swing can be tolerated in an overall reflective load with more transistors in the stack. Layout diagrams 200E shown in FIG. 2E, demonstrate that the series inductances $L_{par}$ can be readily realized by routing inductances of the routing lines laid out between the respective MOS transistors, thus allowing for saving on the chip real estate.

Figure 3A:
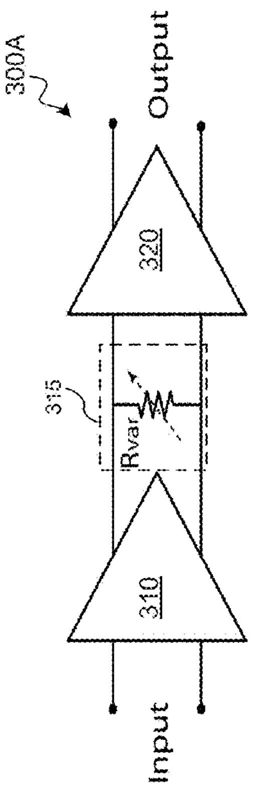
FIG. 3A illustrates an example application of a reflection-type variable attenuator in a variable load amplifier in accordance with one or more implementations.

FIG. 3A illustrates an example application of a reflection-type variable attenuator in accordance with one or more implementations of the subject technology. In certain applications, such as a reconfigurable block 330A, a variable resistor 315 (e.g., an MOS transistor with a resistance $R_{var}$) may be placed between two amplification stages 310 and 320, where changing the resistance of the variable resistor 315 can change the loading to the amplification stage 310. As a result, the gain of the amplification stage 310 may vary. For example, the lower the value of the variable resistance $R_{var}$, the lower the gain of the amplification stage 310. However, using a variable resistor 315, as in many conventional approaches, may be problematic as discussed herein.

At high operation frequencies of interest in the present disclosure (~85 GHz), the output resistance of the amplification stage 310 may be in the order of a couple of hundreds Ohms. In the minimum attenuation mode, the variable resistor 315 may be set to its highest value, and can be an order of magnitude larger than the output resistance of the amplification stage 310. Hence the resistance $R_{var}$, may reach kilo-ohm values for its highest settings. For the highest attenuation case, on the other hand, the variable resistor 315 should be set to its lowest value and this value may be considerably lower than the output resistance of the amplification stage 310 to provide a good amount of attenuation. Therefore, at its lowest setting, the resistance of variable resistor 315 should reach down to a value of a few Ohms. Consequently, a variable resistor with a large dynamic range achieving kilo-ohm range at the high end a few ohms at the low end may be required. To realize this variable resistor with such a wide dynamic range, a substantially large transistor may be used, which can introduce a substantially large parasitic capacitance. At the high operating frequencies of interest, such substantially large capacitors may require quite small inductors in parallel for tuning purposes. It is impractical to realize such small inductors, as they may turn into very tiny loops smaller than the traces and interconnects used to connect the inductor to the transistor.

Another disadvantage associated with using a variable resistor between the two matched amplification stages 310 and 320 arises from a mismatch between the amplification stages 310 and 320 that can result from changing the resistance of the variable resistor. The return loss parameter for the output of the amplification stages 310 (e.g., S22 parameter for the amplification stages 310) and the return loss parameter for the input of the amplification stages 320 (e.g., S11 parameter for the amplification stages 320) may be somewhat poor. The respective poor S22 and S11 parameters for the amplification stages 310 and 320 may cause instability issues. To avoid instability concerns, the range by which the variable resistor 315 can be changed have to be limited, which may ultimately result in a limited attenuation range that can be reliably achievable through using the variable resistor 315. The reflection-type attenuator of the subject technology alleviates the above-mentioned problems as discussed herein.

First, the characteristic impedance (Zo) of the hybrid module 150 of FIG. 1B may be typically 50Ω. For the lowest attenuation, the resistance seen at the reflection ports 152 and 154 of FIG. 1B may be an order of magnitude higher than the characteristic impedance of 50Ω (e.g., have a value of a few hundred Ohms). On the other hand, for the highest attenuation, the resistance seen at the reflection ports 152 and 154 has to be nearly equal to the characteristic impedance of 50Ω, in order to provide a matched condition with zero reflection. That is to say, the total variation range required in the reflection-type attenuator is an order of magnitude smaller than what may be required by the variable resistor 315.

Second, when the reflection-type attenuator is used between the amplification stages 310 and 320, these stages are interfaced with a hybrid module 150 with a fixed input and output impedances equal to its characteristic impedance (Zo). Therefore, the amplification stages 310 and 320 may be well matched with a nearly perfect output return loss parameter (e.g., S22) for the amplification stage 310 and a nearly perfect input return loss parameter (e.g., S11) for the amplification stage 320. Due to these near perfect S22 and S11 parameters, a wide attenuation range can be obtained without any instability concern for interfacing the amplification stage over the wide attenuation range.

Figure 3B:
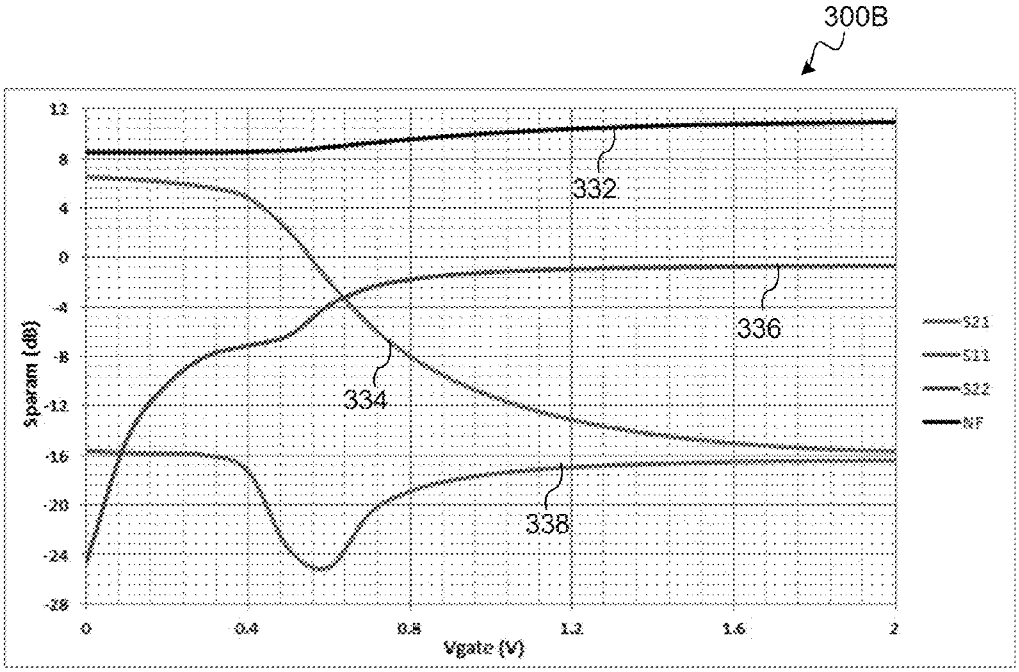
FIG. 3B illustrates example graphs of various characteristics of a reconfigurable block including a variable resistor.

FIG. 3B illustrates example graphs of various characteristics of the reconfigurable block 330A of FIG. A including a variable resistor. In the reconfigurable block 330A, the use of a variable resistor 315, as discussed above, results in a number of limitations and disadvantages. For example, the output return loss parameter (S22) shown by graph 336 and the input return loss parameter (S11) of the amplification stage 320 of FIG. 3A (not shown in FIG. 3B) indicate poor performances. Further, the attenuation variation, as shown by the variation of the attenuation parameter S21 depicted as a graph 334, is limited to nearly 20 dB, however, out of the depicted 20 dB range, only a range of approximately 10 dB may be a reliable attenuation range. This is because, beyond the 10 dB range, performance of the output return loss parameter (S22) may degrade substantially and cause instability issues. Therefore, the reconfigurable block 330A with the variable resistor 315 can not perform reliably as a wide range attenuator with an attenuation range beyond 10 dB.

Figure 4A:
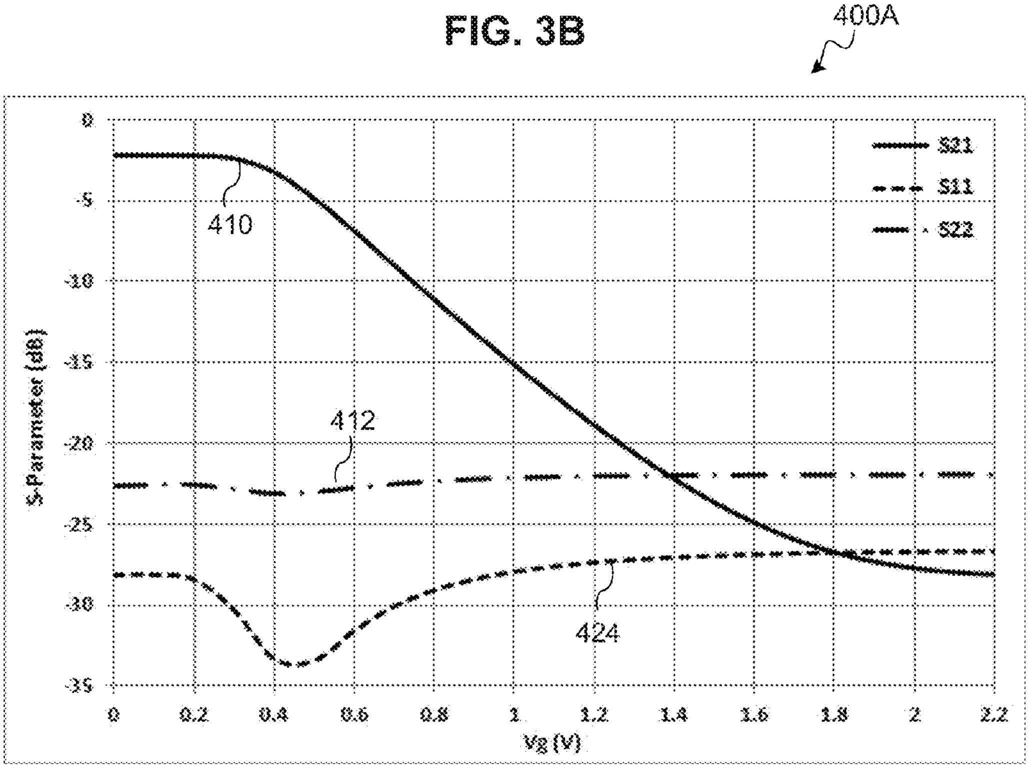
FIG. 4A illustrates example graphs of various characteristics of a reflection-type variable attenuator in accordance with one or more implementations.

FIG. 4A illustrates example graphs of various characteristics of the reflection-type variable attenuator 120 of FIG. 1B in accordance with one or more implementations of the subject technology. The attenuation variation, as shown by the variation of the attenuation parameter S21 depicted as a graph 410, indicate a wide range (e.g., 25 dB) of attenuation variation for the reflection-type variable attenuator, as compared to the limited reliable attenuation range of 10 dB shown in FIG. 3B for the variable resistor. The input return loss parameter (S11) and output return loss parameter (S22) represented by graphs 424 and 412, respectively, are indications of good matching at the input and output ports 122 and 124 of the reflection-type variable attenuator 120, throughout the gain variation range.

Figure 4B:
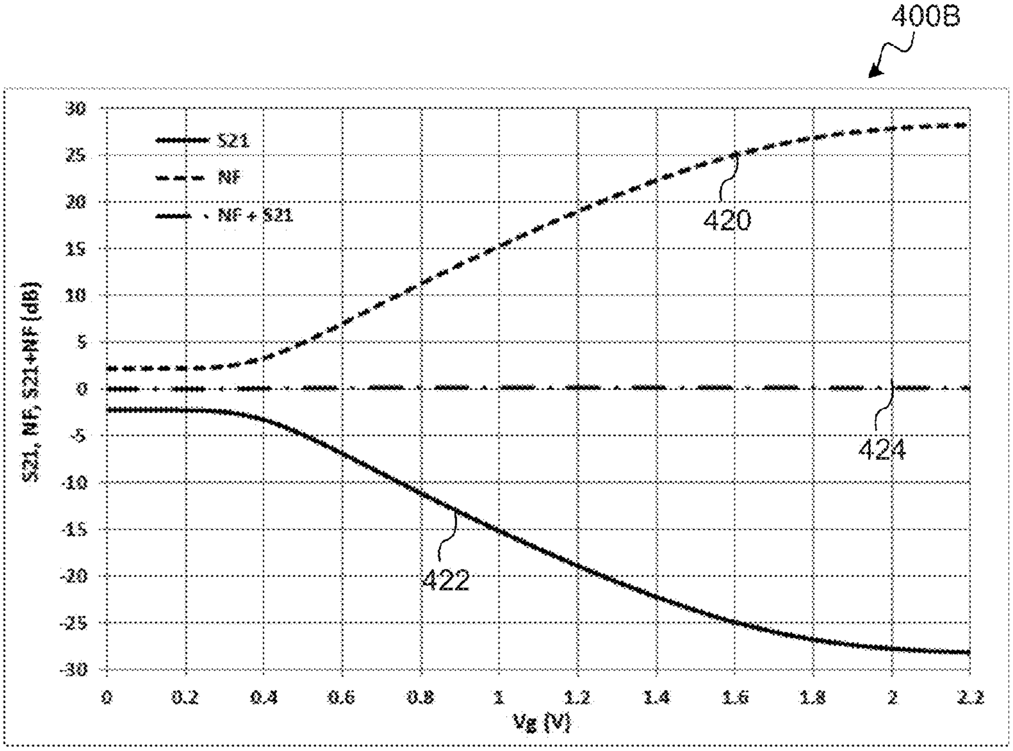
FIG. 4B illustrates example graphs of various characteristics of a variable-type attenuator in accordance with one or more implementations.

FIG. 4B illustrates example graphs of various characteristics of the variable-type attenuator 120 of FIG. 1B in accordance with one or more implementations of the subject technology. The characteristics of the variable-type attenuator 120 shown in FIG. 4B include a noise figure (NF), an attenuation parameter (S21), and a summation of the NF and attenuation, represented by graphs 420, 422, and 424 respectively. The attenuation variation, as shown by graph 422, indicates a wide range (e.g., 25 dB) of attenuation variation for the reflection-type variable attenuator. The variation of NF (e.g., 420) approximately tracks the variation of the attenuation (e.g., 422), so the summation (e.g., 424) of the NF and attenuation is almost zero throughout the attenuation variation range. This is an advantage over the existing solutions, for example, the current commuting VGA, for which the NF may be nearly 10 dB more than the attenuation.

Figure 5:
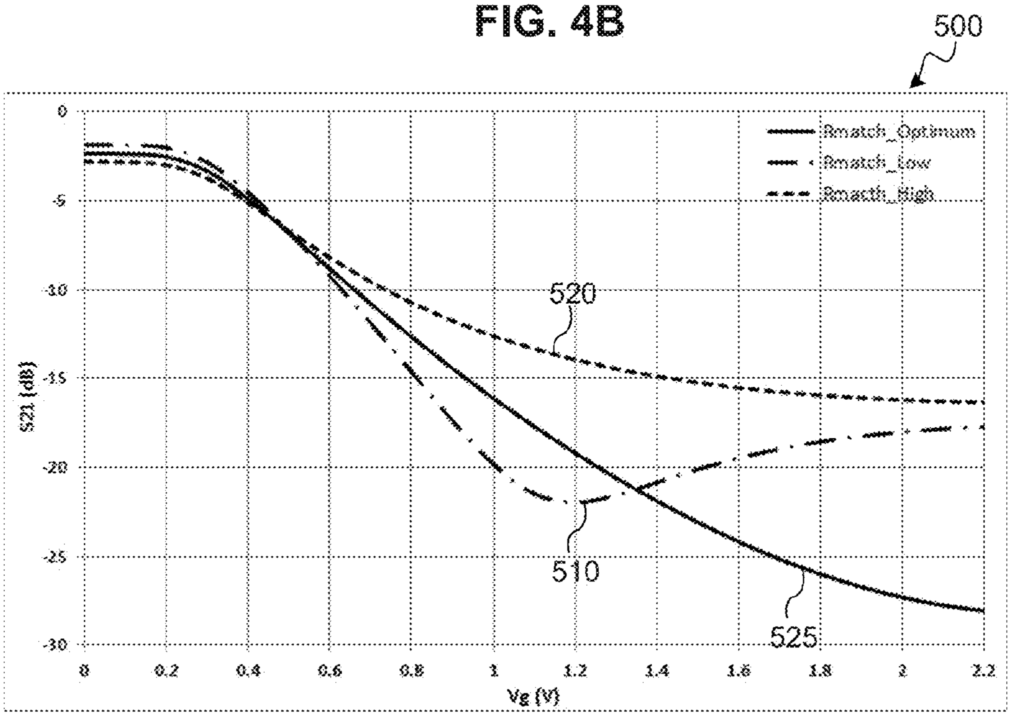
FIG. 5 illustrates example graphs of attenuation variation for various configurations of a reflection-type variable attenuator in accordance with one or more implementations.

FIG. 5 illustrates example graphs of attenuation parameter variation for various configurations of the reflection-type variable attenuator 120 of FIG. 1B in accordance with one or more implementations of the subject technology. The scenarios shown by graphs 510, 520, and 525 correspond to various values for the total resistance (e.g., matched resistance) of termination resistors (R1 and R2) of FIG. 1B or FIG. 2A. For example, the attenuation parameter variation shown by graph 510 is for the scenario where the value of the total resistance of termination resistors is lower than the characteristic impedance ($Z_0$) of the hybrid module 150 of FIG. 1B. In this scenario, the monotonicity may be violated. On the other hand, the attenuation parameter variation shown by graph 520 represents the scenario where the value of the total resistance of termination resistors is higher than the characteristic impedance ($Z_0$) of the hybrid module 150. In the optimum scenario, shown by the graph 525, the value of the total resistance of termination resistors is almost the same as the characteristic impedance ($Z_0$) of the hybrid module 150. As seen form the graphs 510, 520, and 525, the optimum matching (e.g., 525) results in the widest attenuation variation range (e.g., 25 dB), which is a desirable range considering that the losses due to coupling and isolation issues pertaining to integration and on-chip implementation are also included here.

Figure 6:
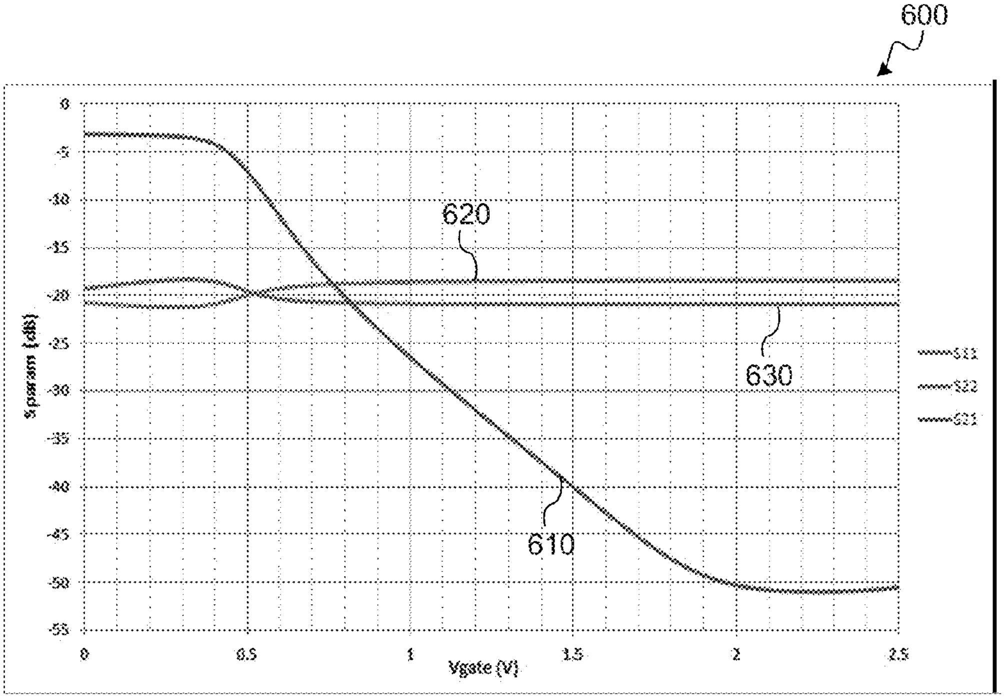
FIG. 6 illustrates example graphs of attenuation parameter and return loss variations for a reflection-type variable attenuator in accordance with one or more implementations.

FIG. 6 illustrates example graphs of attenuation parameter and return loss variations of the reflection-type variable attenuator 120 of FIG. 1B in accordance with one or more implementations of the subject technology. The attenuation parameter (e.g., S21), input return loss parameter (e.g., S11), and output return loss parameter (e.g., S22), shown by graphs 610, 620 and 630 may correspond to a scenario where the reflection-type variable attenuator 120 is used to replace the variable resistor 315 of FIG. 3A. In this scenario, since the amplification stages 310 and 320 of FIG. 3A that are coupled to the reflection-type variable attenuator 120 may be interfaced with a quadrature hybrid module (e.g., 150 of FIG. 1B) of a fixed input and output impedances equal to the characteristic impedance (Zo), they can be well matched with a nearly perfect output return loss parameter (e.g., S22) for the amplification stages 310 and a nearly perfect input return loss parameter (e.g., S11) for the amplification stages 320. Due to these nearly perfect S22 and S11 parameters, a substantially large attenuation range can be obtained without any instability concern for interfacing building blocks over this attenuation range. As demonstrated in FIG. 6, the values of the parameters S11 and S22 parameters are always below −17 dB and may allow to get an attenuation range of S21=−3 dB down to S21=−50 dB without any instability concern for the interfacing blocks. It is understood, however, that after the parasitic extraction and including the losses due to coupling and isolation issues that may exist in an integrated version implemented on-chip (e.g., in certain specific technologies), a maximum attenuation of 30 dB may be more feasible.

Figure 7:
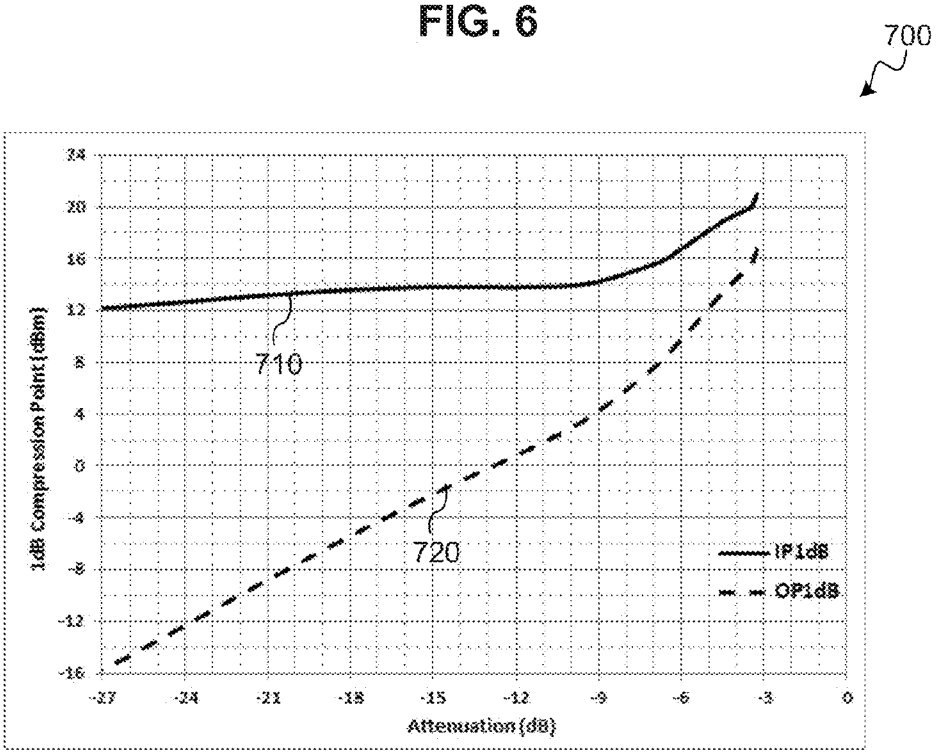
FIG. 7 illustrates example graphs of linearity characteristics of a reflection-type variable attenuator in accordance with one or more implementations.

FIG. 7 illustrates example graphs of linearity characteristics of the reflection-type variable attenuator 120 of FIG. 1B in accordance with one or more implementations of the subject technology. Graphs 710 and 720, respectively, represent input and output 1 dB compression points versus attenuation, for the reflection-type variable attenuator 120. As discussed above, an advantage of the reflection type attenuator 120 is its linearity. Due to the passive nature of the structure, good linearity parameters can be achieved. When set to the high attenuation mode, if the incident signal power was to be dissipated only in the transistors (e.g., T1 and T2 of FIG. 1B), the situation could cause a bottleneck for the linearity. But, the use of the termination resistors (e.g., R1 and R2 of FIG. 1B) may allow absorption of some of the incident power and may permit less voltage swings to pass on to transistors. This may help the linearity as indicated by the input 1 dB compression point shown by graph 710. As seen, even at high attenuation range of S21=−27 dB, the input 1 dB compression point is still higher than 12 dBm, which is a respectable number for the choice of technology and the desired targeted application of the present disclosure.

Figure 8:
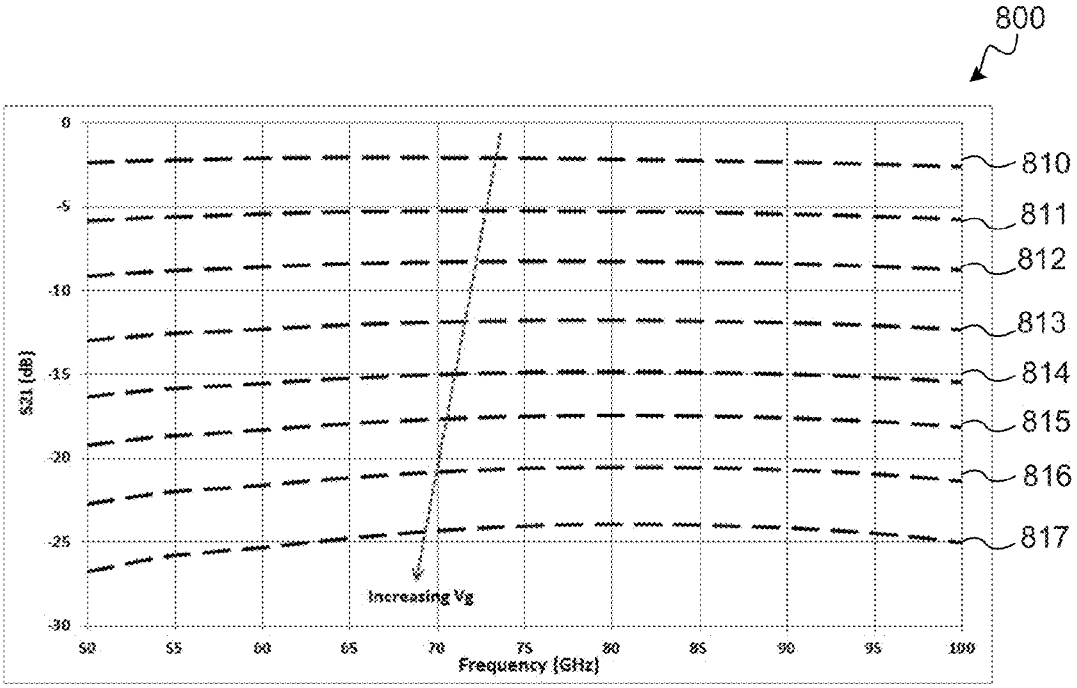
FIG. 8 illustrates example graphs of frequency characteristics of a reflection-type variable attenuator in accordance with one or more implementations.

FIG. 8 illustrates example graphs of frequency characteristics of a reflection-type variable attenuator 120 of FIG. 1B in accordance with one or more implementations of the subject technology. Graphs 810-817 represent variation of attenuation of the reflection-type variable attenuator 120 versus operating frequency, for various values of the control voltage Vg of FIG. 1B. The values of the control voltage increases as moving from the graph 810 to the graph 817. The graphs 810-817 indicate that the reflection-type attenuator 120 can operate at substantially high frequencies with a substantially wide bandwidth (e.g., operating in 50-100 GHZ range) despite the use of a CMOS devices with an ft value of ~50 GHz.

Figure 9:
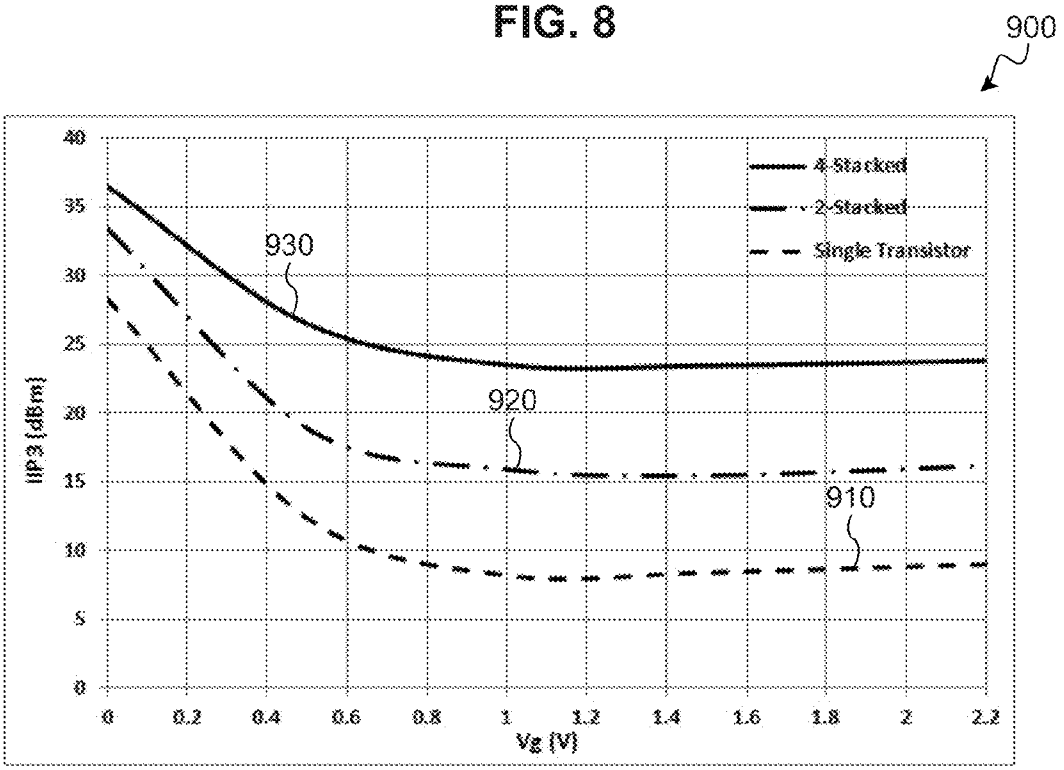
FIG. 9 illustrates example graphs of linearity characteristics of a reflection-type variable attenuator with multiple transistors in accordance with one or more implementations.

FIG. 9 illustrates example graphs of linearity characteristics of a reflection-type variable attenuator with multiple transistors in accordance with one or more implementations of the subject technology. Graphs 910, 920, and 930, respectively, show variations of input intercept point (IIP3) versus the control voltage Vg of FIGS. 1B and 2A, for variable attenuator topologies with single transistor (e.g., FIG. 1B), two transistors stacked (e.g., 220 of FIG. 2B), and four transistors stacked (e.g., FIGS. 1B and 240 of FIG. 2B). As is seen from the graphs, the values of the IIP3 improve as the number of stacked transistors increases. For example, the IIP3 improves by 6 dB by doubling the number of stacked transistors. The graphs also show that the linearity improves as lower values of the control voltage Vg are used. Lower values of the control voltage Vg may correspond to lower attenuation modes.

Figure 10:
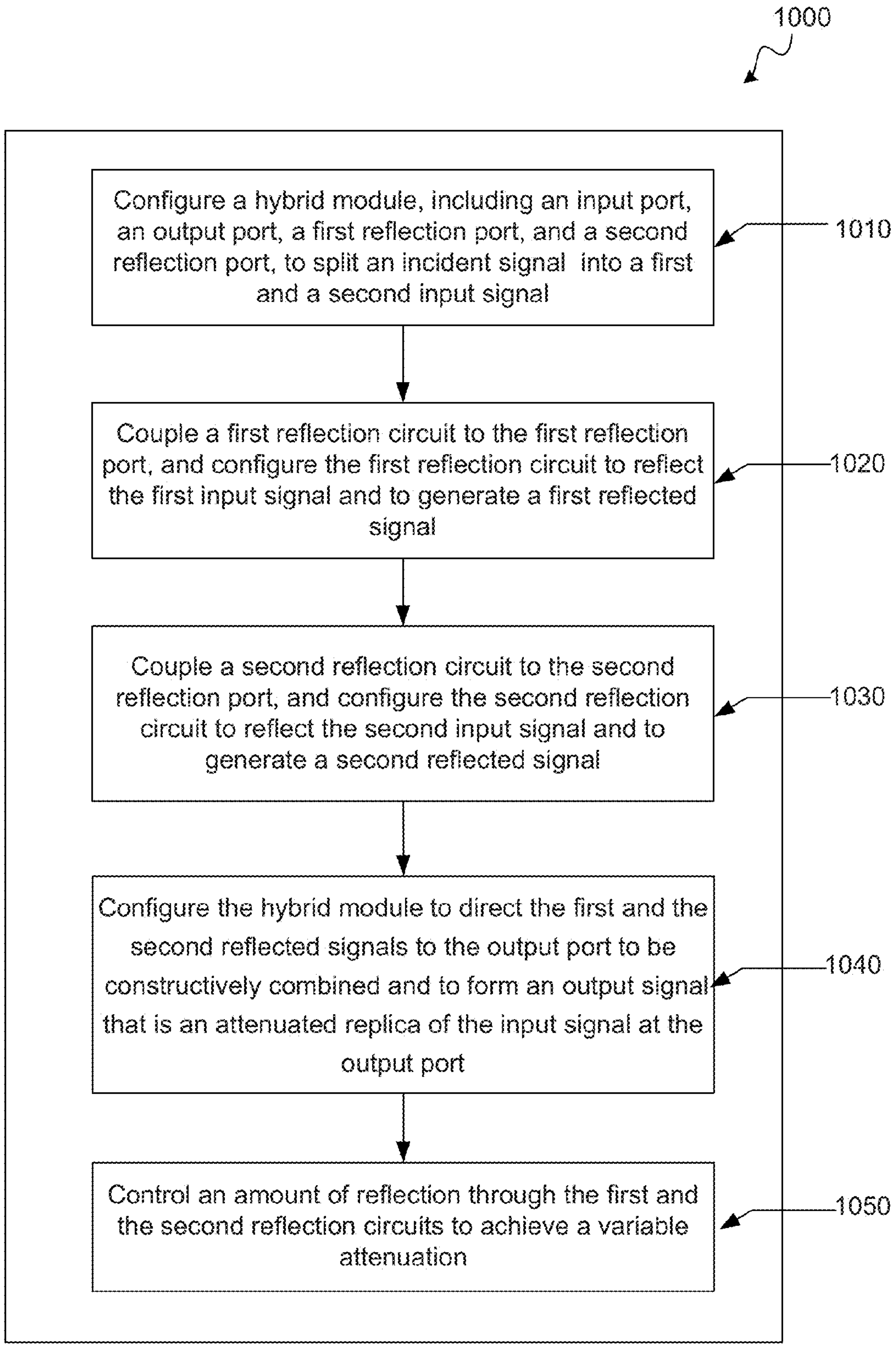
FIG. 10 illustrates an example method for providing reflection-type variable attenuator in accordance with one or more implementations.

FIG. 10 illustrates an example method 1000 for providing the reflection-type variable attenuator 120 of FIG. 1B in accordance with one or more implementations of the subject technology. For explanatory purposes, the example method 1000 is described herein with reference to the reflection-type variable attenuator 120 of FIG. 1B; however, the example method 1000 is not limited to the reflection-type variable attenuator 120. Further for explanatory purposes, the blocks of the example method 1000 are described herein as occurring in serial, or linearly. However, multiple blocks of the example method 1000 may occur in parallel. In addition, the blocks of the example method 1000 need not be performed in the order shown and/or one or more of the blocks of the example method 1000 need not be performed.

At operation block 1010, a hybrid module (e.g., 150 of FIG. 1B), including an input port (e.g., 122 of FIG. 1B), an output port (e.g., 124 of FIG. 1B), a first reflection port (e.g., 152 of FIG. 1B), and a second reflection port (e.g., 154 of FIG. 1B) may be configured to split an incident signal (e.g., 125 of FIG. 1B) received at the input port into a first and a second input signal (e.g., 151 and 153 of FIG. 1B). At operation block 1020, a first reflection circuit (e.g., 160 of FIG. 1B) may be coupled to the first reflection port, and configured to reflect the first input signal and to generate a first reflected signal (e.g., 155 of FIG. 1B). The first reflection circuit may include one or more first transistors (e.g., T1 of FIG. 1B, and T1-T4 of FIG. 2A).

At operation block 1030, a second reflection circuit (e.g., 162 of FIG. 1B) may be coupled to the second reflection port, and configured to reflect the second input signal and to generate a second reflected signal (e.g., 157 of FIG. 1B). The second reflection circuit may include one or more second transistors (e.g., T2 of FIG. 1B, and T1-T4 of FIG. 2A). The hybrid module may be configured to direct, at operation block 1040, the first and the second reflected signals to the output port. The hybrid module may constructively combine the first and the second reflected signals, at the output port, and form an output signal (e.g., 127 of FIG. 1B) that is an attenuated replica of the incident signal at the output port. At operation block 1050, an amount of reflection through the first and the second reflection circuits may be controlled via the control voltage (e.g., Vg of FIG. 1B) to achieve a variable attenuation.

The reflection-type variable attenuator of the present disclosure was demonstrated herein to have many advantages over the existing variable attenuators. For example, an existing hybrid-Π attenuator may incorporate shunt as well as series transistors that are acting as variable resistors. In the minimum attenuation mode, shunt transistors may be open circuits and series transistors may become short circuits. In the maximum attenuation mode, series transistors are open circuits while shunt transistors may provide a matched termination impedance. The hybrid-Π attenuators may be most common types of attenuators at low frequency applications. However at high frequencies, series transistors can insert a substantial insertion loss in the signal path. Therefore, due to a prohibitively large insertion loss, such attenuators may be impractical to be implemented at the E-band (~85 GHz).

The reflection-type variable attenuator of the present disclosure is also advantageous over the current commuting VGAs, which although are high frequency variable attenuators, but may suffer from poor noise performances. As discussed above, in the reflection-type variable attenuator of the present disclosure, CMOS devices (with ft of 50 GHz) were used for the 85 GHz design. That was possible since CMOS transistors were only used to present a reflective passive load to the hybrid module 150. Diodes (e.g., PIN diodes, Schottky diodes, or diode connected BJTs) may have better frequency responses than the MOS transistors used in the reflection-type variable attenuator of the present disclosure. However, if the variable load is implemented by diodes instead of MOS transistors, the linearity can be degraded by more than an order of magnitude. Another advantage of the use of the MOS transistors is that can be stacked on top of each other to improve the linearity even further, as discussed above.

The reflection-type variable attenuator of the present disclosure is able to operate at high frequencies, unlike the hybrid-Π attenuators, and can provide a good noise performance, unlike the current commuting VGAs. Further, reflection-type variable attenuator of the subject technology can provide a good input and output matching that allows operation with a wide attenuation range, without posing stability issues to interfacing blocks, unlike the existing reconfigurable blocks with variable resistors.

For the example applications in wireless backhaul, unlike many other applications, transmission of a pure signal at the transmitter output may be highly desirable. Therefore, achievement of a high SNR at the transmitter output and a low NF transmit chain may be crucial. The highly linear integrated reflection-type variable attenuator of the present disclosure, for the example wireless-backhaul applications, can be used after the power amplifier block, where a high attenuation range is required, with minimal impact on the transmit SNR. To have a minimal impact on the NF and consequently the SNR, such a block with high attenuation should move as close as possible to the antenna (see FIG. 1A). This can prevent increasing the NF of the overall chain that can happen when a high attenuation block is followed by a high noise RF block (e.g., at a high operating frequency, such as 85 GHz).

Those of skill in the art would appreciate that the various illustrative blocks, modules, elements, components, and methods described herein may be implemented as electronic hardware, computer software, or combinations of both. To illustrate this interchangeability of hardware and software, various illustrative blocks, modules, elements, components, and methods have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A circuit for a reflection-type variable attenuator, the circuit comprising:

a hybrid module including an input port, an output port, a first reflection port, and a second reflection port, the hybrid module configured to split an incident signal received at the input port into a first and a second input signal;

a first reflection circuit, including at least one first transistor, coupled to the first reflection port, the first reflection circuit configured to reflect the first input signal to generate a first reflected signal; and a second reflection circuit, including at least one second transistor, coupled to the second reflection port, the second reflection circuit configured to reflect the second input signal to generate a second reflected signal, wherein the hybrid module is further configured to direct the first and the second reflected signals to the output port, wherein the first and the second reflected signals are constructively combined to form an output signal, wherein the output signal is an attenuated replica of the incident signal, and wherein a variable attenuation is achieved by controlling an amount of reflection through the first and the second reflection circuits.

2. The circuit of claim 1, wherein the amount of reflection through the first and the second reflection circuits is controlled by varying a control voltage applied to the at least first transistor and the at least second transistor.

3. The circuit of claim 1, wherein the at least first transistor and the at least second transistor are MOS transistors, wherein the at least first transistor and the at least second transistor are operable as variable resistors by controlling a voltage applied to gate terminals of the transistors, and wherein the at least first transistor and the at least second transistor are identical NMOS transistors.

4. The circuit of claim 1, wherein each of the first and the second reflection circuits further includes at least one tuning inductor element, and wherein the at least one tuning inductor element is configured to tune out parasitic capacitances associated with the at least first transistor or the at least second transistor.

5. The circuit of claim 1, wherein each of the first and the second reflection circuits further includes at least one resistor element, and wherein a total resistance of the at least one resistor element matches a characteristic impedance of the hybrid module.

6. The circuit of claim 1, wherein the first and the second reflection circuits are configured to facilitate operation of the reflection-type variable attenuator at high operation frequencies, wherein the high operation frequencies include a range of approximately 50-100 GHz.

7. The circuit of claim 6, wherein the first and the second reflection circuits are configured to facilitate operation of the reflection-type variable attenuator at the high frequency, while maintaining values of a noise figure and an attenuation of the reflection-type variable attenuator approximately the same over a range of attenuation variation.

8. The circuit of claim 1, wherein the reflection-type variable attenuator is configured to provide a desired range of attenuation variation including approximately 5-50 dB, while maintaining matched input and output ports and desired values for linearity and input and output return losses.

9. A method for providing a reflection-type variable attenuator, the method comprising:

configuring a hybrid module, including an input port, an output port, a first reflection port, and a second reflection port, to split an incident signal received at the input port into a first and a second input signal;

coupling a first reflection circuit to the first reflection port, and configuring the first reflection circuit to reflect the first input signal and to generate a first reflected signal, the first reflection circuit including at least one first transistor;

coupling a second reflection circuit to the second reflection port, and configuring the second reflection circuit to reflect the second input signal and to generate a second reflected signal, the second reflection circuit including at least one second transistor;

configuring the hybrid module to:

direct the first and the second reflected signals to the output port, constructively combine the first and the second reflected signals at the output port, and form an output signal that is an attenuated replica of the incident signal at the output port; and controlling an amount of reflection through the first and the second reflection circuits to achieve a variable attenuation.

10. The method of claim 9, wherein controlling the amount of reflection through the first and the second reflection circuits is performed by varying a control voltage applied to the at least first transistor and the at least second transistor.

11. The method of claim 9, wherein the at least first transistor and the at least second transistor are MOS transistors, and the method further comprises operating the at least first transistor and the at least second transistor as variable resistors by controlling a voltage applied to gate terminals of the transistors, and wherein the at least first transistor and the at least second transistor are identical NMOS transistors.

12. The method of claim 9, wherein each of the first and the second reflection circuits further includes at least one tuning inductor element, and the method further comprises configuring the at least one tuning inductor element to tune out parasitic capacitances associated with the at least first transistor or the at least second transistor.

13. The method of claim 9, wherein each of the first and the second reflection circuits further includes at least one resistor element, and the method further comprises matching a total resistance of the at least one resistor element with a characteristic impedance of the hybrid module.

14. The method of claim 9, further comprising configuring the first and the second reflection circuits to facilitate operation of the reflection-type variable attenuator at high operation frequencies, wherein the high operation frequencies include a range of approximately 50-100 GHz.

15. The method of claim 14, further comprising configuring the first and the second reflection circuits to facilitate operation of the reflection-type variable attenuator at the high frequency, while maintaining values of a noise figure and an attenuation of the reflection-type variable attenuator approximately the same over a range of attenuation variation.

16. The method of claim 9, further comprising configuring the reflection-type variable attenuator to provide a desired range of attenuation variation including approximately 5-50 dB, while maintaining matched input and output ports and desired values for linearity and input and output return losses.

17. A communication system comprising:

a transmitter configured to transmit radio-frequency (RF) signals, the transmitter including at least one reflection-type variable attenuator circuit comprising:

a hybrid module including an input port, an output port, a first reflection port, and a second reflection port; the hybrid module configured to split an incident signal received at the input port into a first and a second input signal;

a first reflection circuit, including at least one first transistor, coupled to the first reflection port, the first reflection circuit configured to reflect the first input signal to generate a first reflected signal; and a second reflection circuit, including at least one second transistor, coupled to the second reflection port, the second reflection circuit configured to reflect the second input signal to generate a second reflected signal, wherein the hybrid module is further configured to direct the first and the second reflected signals to the output port, wherein the first and the second reflected signals are constructively combined to form an output signal, wherein the output signal is an attenuated replica of the incident signal, and wherein a variable attenuation is achieved by controlling an amount of reflection through the first and the second reflection circuits.

18. The communication system of claim 17, wherein, the amount of reflection through the first and the second reflection circuits is controlled by varying a control voltage applied to the at least first transistor and the at least second transistor, the at least first transistor and the at least second transistor are MOS transistors and are operable as variable resistors by controlling a voltage applied to gate terminals of the transistors, and the at least first transistor and the at least second transistor are identical NMOS transistors.

19. The communication system of claim 17, wherein, each of the first and the second reflection circuits further includes at least one tuning inductor element, the at least one tuning inductor element is configured to tune out parasitic capacitances associated with the at least first transistor or the at least second transistor, each of the first and the second reflection circuits further includes at least one resistor element, and a total resistance of the at least one resistor element matches a characteristic impedance of the hybrid module.

20. The communication system of claim 17, wherein, the first and the second reflection circuits are configured to facilitate operation of the reflection-type variable attenuator at high operation frequencies including a range of approximately 50-100 GHz, the first and the second reflection circuits are configured to facilitate operation of the reflection-type variable attenuator at the high frequency, while values of noise figure and attenuation of the reflection-type variable attenuator are approximately the same over a range of the attenuation variation, and the reflection-type variable attenuator is configured to provide a desired range of attenuation variation including approximately 5-50 dB, while maintaining matched input and output ports and desired values for linearity and input and output return losses.

* * * * *